United States Patent [19]

Ulyanov et al.

[11] 4,205,391

[45] May 27, 1980

[54] DEVICE FOR ENCODING AND INPUTTING TO COMPUTER ALPHABETIC AND TOPOLOGICALLY REPRESENTED GRAPHIC DATA THAT DESCRIBES, IN PARTICULAR, STRUCTURAL FORMULAE OF CHEMICAL COMPOUNDS

[75] Inventors: Gennady P. Ulyanov; Anatoly R. Maslov, both of Novosibirsk, U.S.S.R.

[73] Assignee: Novosibirsky Institut Organicheskoi Khimii Sibirskogo Otdelenia Akademii Nauk SSR, Novosibirsk, U.S.S.R.

[21] Appl. No.: 914,213

[22] Filed: Jun. 9, 1978

[30] Foreign Application Priority Data

Jun. 20, 1977 [SU] U.S.S.R. .............................. 2497583

[51] Int. Cl.² ............................................ G06F 3/14
[52] U.S. Cl. .................................. 364/900; 340/706; 364/496
[58] Field of Search ... 364/200 MS File, 900 MS File, 364/419, 496, 520; 340/706, 707, 365 R; 235/454

[56] References Cited

U.S. PATENT DOCUMENTS

| | | | |
|---|---|---|---|
| 3,256,422 | 1/1966 | Meyer et al. | 235/454 |
| 3,399,401 | 8/1968 | Ellis et al. | 364/200 |
| 3,609,695 | 9/1971 | Pirkle | 364/900 |
| 3,618,029 | 11/1971 | Graven | 364/900 |
| 3,720,948 | 3/1973 | Eichen et al. | 364/900 |
| 3,832,693 | 8/1974 | Ishizaki et al. | 364/900 |
| 3,919,691 | 11/1975 | Noll | 364/900 |
| 3,944,740 | 3/1976 | Murase et al. | 340/706 |
| 4,058,849 | 11/1977 | Fitzgerald et al. | 364/520 |
| 4,078,249 | 3/1978 | Lelke et al. | 364/200 |
| 4,079,450 | 3/1978 | Grimm et al. | 364/200 |

FOREIGN PATENT DOCUMENTS 406211  2/1974  U.S.S.R. .

OTHER PUBLICATIONS

Saxberg et al., *Journal of Chem. Inf. and Computer Sciences*, vol. 16, No. 4, 1976, pp. 233-237.
Zamora et al., *Journal of Chem. Inf. and Computer Sciences*, vol. 16, No. 4, 1976, pp. 219-222.

Primary Examiner—Mark E. Nusbaum
Attorney, Agent, or Firm—Fleit & Jacobson

[57] ABSTRACT

A device for encoding and inputting to a computer alphabetic and topologically represented graphic data that describes, in particular, structural formulae of chemical compounds, comprising an encoding tablet, a changeable encoding form placed on the encoding tablet, a coordinate counter coupled to a computer communication line and to coordinate decoders which, in turn, are coupled to the encoding tablet, a pulse generator, a pulse distributor coupled to the pulse generator, to the coordinate decoders and to the coordinate counter, a code-pulse decoder coupled to the pulse generator and to the computer communication line, an electronic writing means which is a unique and sufficient facility exercising control over the operation of the device and including an amplifier coupled to a code-pulse decoder, a coordinate pickup coupled to the amplifier, a pressure sensor coupled to the pulse generator, a beginning-of-line symbol generator coupled to the computer communication line, and a changeable writing member which is designed as part of the pressure sensor and of the beginning-of-line symbol generator.

10 Claims, 11 Drawing Figures

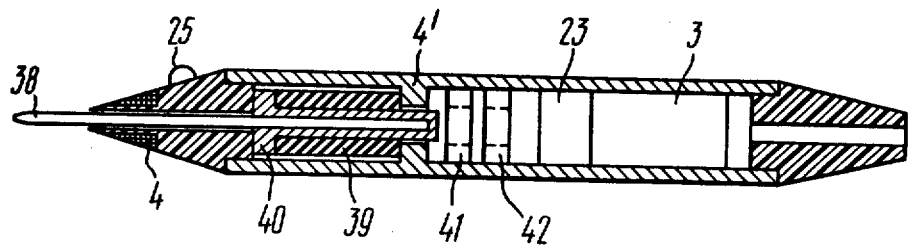
FIG. 3
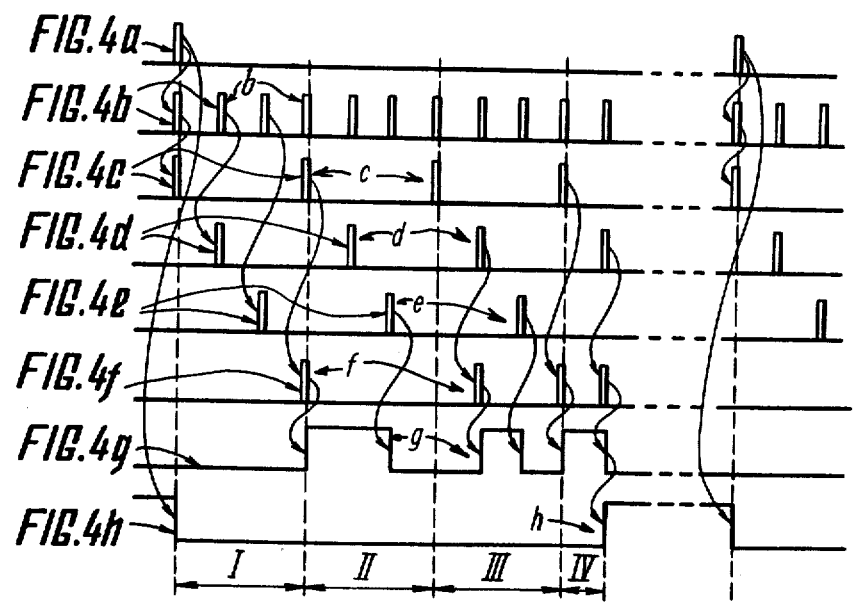

DEVICE FOR ENCODING AND INPUTTING TO COMPUTER ALPHABETIC AND TOPOLOGICALLY REPRESENTED GRAPHIC DATA THAT DESCRIBES, IN PARTICULAR, STRUCTURAL FORMULAE OF CHEMICAL COMPOUNDS

FIELD OF THE INVENTION

The invention relates to graphic input devices for computers, and more particularly to devices that encode and feed into computers alphabetic and topologically represented graphic data that describes, in particular, structural formulae of chemical compounds.

The invention is suitable for automated control systems relating to industry and production processes; for systems that deal with automated inventories of goods in warehouses, such as spares, electronic components, chemical agents, foodstuffs, etc.; for information services concerned with libraries, transportation and merchandizing and for many other uses where a large amount of data of very diverse types is to be fed in a computer on a prompt basis.

The invention can be used successfully in scientific chemical/biological information-oriented centers for automated preparation of machine catalogs of structural data. Such catalogs constitute an important part of information retrieval systems for chemistry which provide a foundation for creation of systems capable of machine detection of correlations such as "structure-property" (for example, biological activity of substances) and others. It is possible to couple the device directly to a computer and utilize it, for example, as an entry console from which search requests in graphic and alphabetic form are fed in the computer.

In addition, the device may be used as part of other entry devices, say, a contactless multipurpose keyboard for displays or typewriters provided, for example, with Japanese character type.

At present, a large amount of alphabetic and topologically represented data must be encoded and input to computers effectively. This is a difficult problem since a sufficient supply of labor cannot be attained and costly machinery cannot be used for the purpose due to the fact that existing technical means feature low profitability. This hinders considerably the development of research work in chemistry relating to preparation of machine catalogs of structural data.

Automated systems for preparation of the above catalogs utilize universal graphic input facilities such as graphic displays with light pens, which cannot resolve the problem to the fullest extent due to high cost of such facilities. There are other known technical means which offer a reasonable cost but, at the same time, have a low productivity and limited functional capabilities. In order to provide for a long-term use of machine catalogs, the encoding of the source data must be as complete as possible; in addition, the source data must be allowed to be translated, on a machine basis, to various codes which apply to the character of the tasks being handled. The invention can solve the problems described above to a significant extent.

DESCRIPTION OF THE PRIOR ART

Known in the art is a device for automatic encoding of topologically represented structural formulae of chemical compounds (cf. FRG Pat. No. 1,218,186, cl.42m 14, 1966, which corresponds to U.S. Pat. No. 3,256,422).

The described device comprises an immovable rectangular mount structure and a movable small frame with a coordinate grid, a synchronization track and a topological pattern of a structural formula inscribed on the frame. Electric motors enable the frame to move with respect to an optical reading matrix to scan the latter with the result that the source data is converted to digital form.

The device is sophisticated, since it includes the optical reading matrix and the mechanism which enables reciprocating movement of the frame, and is therefore costly. Moreover, the device offers a low productivity for a variety of reasons. First, a topological pattern of the structural formula to be input must be applied on to the frame, which pattern must be of a higher quality as to be thickness, color, intensity and other properties of its lines. In addition, the completeness of encoding requires that alphabetic data be input from an additional device.

Known in the art is a special-purpose typewriter intended for encoding and inputting structural formulae of chemical compounds (cf. Antonio Zamora and David L. Dayton, of Chemical Information and Computer Science Journal vol. 16, No. 4, pp. 219–222, 1976).

The typewriter has a special type used to represent the elements of topologically represented graphic data to be input, which may be chemical interatomic bonds of various types. The typewriter is operated in conjunction with a special-purpose disc-storage computer.

Only skilled operators, however, can operate the type-writer. Since a great number of moving parts is available to the typewriter, it is relatively costly and has a lower reliability. In addition, its functional capabilities are low since it is provided with a limited set of characters.

A device for reading graphic data is known (cf. the USSR Inventor's Certificate 406,211, Int. Cl. G06K 11/00, Published Dec. 12, 1971).

This device comprises an encoding tablet, coordinate buses arranged as a rectangular grid and adapted to form a flux of electromagnetic energy which determines the coordinates of the data to be input, and coordinate counter. The latter has its outputs coupled to a computer communication line and to the data outputs of coordinate decoders. The outputs of the coordinate decoders are coupled to respective coordinate buses of the encoding tablet.

Also, the device comprises an amplifier coupled to a coordinate pickup which is designed to convert the flux of electromagnetic energy from the coordinate buses to electrical signals. A pressure sensor in the housing of the coordinate pickup is used to make the device operative.

A pulse generator is available which has its trigger input coupled to the output of the pressure sensor.

Incorporated in the device are a control unit, an amplitude-phase discriminator, a single pulse extraction circuit, an OR gate, a coordinate register, a code transmission gate unit, and a coordinate comparator/generator.

The coordinate pickup is coupled, via the pressure sensor, to the control unit and, via the amplifier, amplitude-phase discriminator and single pulse extraction circuit, to the coordinate register. The single pulse extraction circuit is coupled to the control unit and to the code transmission gate unit via the OR gate. The code transmission gate unit is coupled to the coordinate comparator/generator whose output serves as the device output.

The device produces a redundant output data since its resolution is too high. The coordinates of input data are determined using the total flux of electromagnetic energy from adjacent coordinate buses; it is impossible, however, to eliminate the redundancy by using a greater spacing interval between the coordinate buses. The availability of the amplitude-phase discriminator requires that the position of the coordinate pickup be maintained very accurately (in strict perpendicularly or at a constant angle to the encoding tablet) in drawing input data. If this requirement is not met, the coordinates are determined inaccurately, thereby reducing the operational reliability of the device. In addition, the device has a limited number of functional capabilities since output data does not contain an interrelation symbol which could connect the elements of graphic input data and no provision is made for the encoding and inputting of alphabetic data.

SUMMARY OF THE INVENTION

An object of the invention is to provide a device for encoding and inputting to a computer alphabetic and topologically represented graphic data that describes, in particular, structural formulae of chemical compounds, which device ensures the completeness of encoding input data, alphabetic and topologically represented graphic, along with a minimal redundancy of output data, provision being made for the translation of input data, on a machine basis, into any codes desirable.

Another object of the invention is to provide the device offering a much higher productivity.

Another object of the invention is to simplify as much as possible the operations concerned with encoding and inputting data to a computer.

A still further object of the invention is to provide the device which can be operated by semi-skilled operators.

A still another object of the invention is to provide a simple and reliable monitoring of the operator's actions during encoding and inputting data to a computer.

According to the invention there is provided a device for encoding and inputting to a computer alphabetic and topologically represented graphic data that describes, in particular, structural formulae of chemical compounds, comprising an encoding tablet incorporating coordinate buses made in the form of linearly extended induction coils, arranged as a rectangular grid and adapted to establish a flux of electromagnetic energy so as to generate the coordinates of input data; a coordinate counter having its outputs coupled to a computer communication line and to the data inputs of coordinate decoders which have their outputs coupled to the coordinate buses; an amplifier; a coordinate pickup that converts the flux of electromagnetic energy from the coordinate buses into electrical signals and is coupled to the input of the amplifier; a pressure sensor disposed in the housing of the coordinate pickup and having its output coupled to the input of a pulse generator producing trigger pulses for said device; a changeable encoding form divided into two zones as follows: one zone in which topological patterns of graphic input data, which may be topological patterns of structural formulae of chemical compounds, are encoded; and another zone in which randomly selected alphabetic data, which may be the names of atoms of structural fragments as well as various types of interatomic chemical bonds, are encoded, said changeable encoding form having a coordinate grid aligned with the rectangular grid of the coordinate buses, and the spacing interval of the coordinate grid of the changeable encoding form being selected so that the following conditions are satisfied: there is provided a sufficient area to accomodate, at the adjacent nodal points of the coordinate grid, the representations of the elements of graphic input data, which may be the adjacent tie points of structural formulae; the preset allowances of precision with which graphic input data is represented are guaranteed; and the redundancy of output data is eliminated; a pulse distributor having its output coupled to the output of the pulse generator, having its three outputs adapted to produce successive pulses which are time-shifted with respect to one another by a time interval equal to the oscillation period of the pulse generator, having two of said three outputs coupled to the inputs of the coordinate decoders which operate to strobe in a given succession the signals from the two outputs and to excite, in a pulsed manner, respective coordinate buses, and having the last one of said three outputs coupled to a counting input of the coordinate counter which has its reset input coupled to the pressure sensor; a code-pulse decoder adapted to pick out a pair of pulses, which follow each other with a delay equal to the oscillation period of the pulse generator, from a train of input pulses and to form a control signal, the code-pulse decoder having its input coupled to the output of the amplifier and having its output coupled to a blocking input of the pulse generator and to the computer communication line; a beginning-of-line symbol generator disposed in the housing of the coordinate pickup and adapted to generate interrelation symbols concerned with the elements of graphic input data, one of such symbols being provided, in particular, to establish interrelation between the tie points of structural formulae of chemical compounds, said beginning-of-line symbol generator having its data output and its reset input coupled to the computer communication line; and a changeable writing member designed as part of the pressure sensor and of the beginning-of-line symbol generator, said amplifier and said changeable writing member each disposed in the housing of the coordinate pickup as well as the beginning-of-line symbol generator, used to register the displacement of the changeable writing member along its longitudinal axis, and said pressure sensor being adapted to serve altogether as an electronic writing means which is a unique and sufficient facility designed to effect control over the entire device and to provide for encoding and inputting to a computer graphic data and for representing the latter on the changeable encoding form, all these operations being performed concurrently.

Advantageously, the code-pulse encoder incorporates a two-digit binary counter having its input coupled to the output of the amplifier and having its high-order digit place output coupled to the blocking input of the pulse generator and to the computer communication line; and an OR gate having its output coupled to a reset input of the two-digit binary counter and having its inputs coupled, respectively, to the third output of the pulse distributor and to the output of the pressure sensor, thereby enabling the code-pulse decoder to reset at the end of each operating period of the device and at the moment that the device commences its operation on activation of the pressure sensor.

Preferably, the beginning-of-line symbol generator comprises a flip-flop and a sensor that acknowledges that the changeable writing member touches the surface of the encoding tablet, said sensor having its output coupled to one of the outputs of the flip-flop which has its other input and its output each coupled to the computer communication line.

It is advantageous that the device further comprises an indication circuit incorporating a light indicator which provides for visual monitoring of the serviceability of the device, and so of the presence of data exchange between the device and a computer; a first AND gate having its output coupled to the light indicator; and a second AND gate having its output coupled to one of the inputs of the first AND gate which has its other input coupled to the output of the code-pulse decoder, and the inputs of the second AND gate being coupled, respectively, to the output of the pressure sensor and to the computer communication line.

It is preferable that the sensor, that acknowledges that the changeable writing member touches the surface of the encoding tablet, and the pressure sensor comprise altogether an elastic member and a movable collet member with the changeable writing member, said movable collet member being connected mechanically with the housing of the coordinate pickup via the elastic member, the sensor that acknowledges that the changeable writing member touches the surface of the encoding tablet having a first sensor that indicates axial position of the changeable writing member, said first axial position sensor being mechanically connected with the housing of the coordinate pickup and being provided with its output coupled to the input of the flip-flop of the beginning-of-line symbol generator to produce a control signal at times when the changeable writing member touches the surface of the encoding tablet, and the pressure sensor being provided with a second sensor that indicates axial position of the changeable writing member, said second axial position sensor being mechanically connected with the housing of the coordinate pickup and being provided with its output coupled to the blocking input of the pulse generator so as to produce a control signal on depression on the surface of the encoding tablet by the changeable writing member with the result that the device is triggered.

The invention therefore ensures the completeness of encoding input data, alphabetic and topologically represented graphic, along with a minimal redundancy of output data, provision being made for the translation of input data, on a machine basis, into any codes desirable; provides a much higher productivity; makes it possible to simplify as much as possible the operations concerned with encoding and inputting data to a computer; provides the device which can be operated by semi-skilled operators; and ensures a simple and reliable monitoring of the operator's actions during encoding and inputting data to a computer. In addition, the proposed device features a higher reliability and makes it possible to considerably cut down the costs on the coding and inputting of alphabetic and topologically represented data to a computer.

The productivity of the device, calculated on a maximum basis, amounts to 80,000 structural formulae per month.

DESCRIPTION OF THE DRAWINGS

Other features and advantages of the invention will appear from the following description of a preferred embodiment of the invention, taken in conjunction with the accompanying drawings in which:

FIG. 3 shows the design of an electronic writing means, according to the invention;

FIG. 4, which is comprised of FIGS. 4a through 4h shows timing diagrams according to which pulses a, b, c, d, e, f and signals g, h are formed and which provide for better understanding of the operation of the device, according to the invention.

DESCRIPTION OF THE INVENTION

Figure 1:
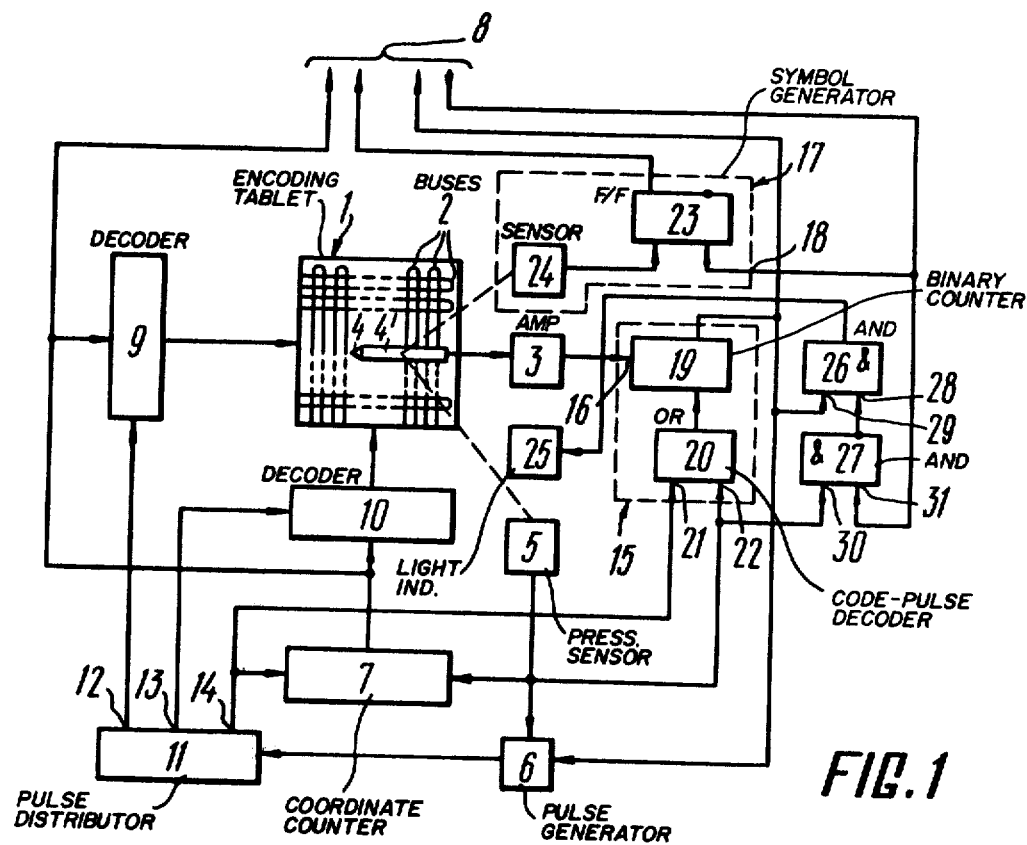
FIG. 1 is a block diagram of a device for encoding and inputting to a computer alphabetic and topologically represented graphic data that describes, in particular, structural formulae of chemical compounds, according to the invention.

The device for encoding and inputting to a computer alphabetic and topologically represented graphic data that describes, in particular, structural formulae of chemical compounds, according to the invention, comprises an encoding tablet 1 (FIG. 1) incorporating coordinate buses 2 arranged as a rectangular grid; a coordinate pickup 4 having a housing 4' and coupled to the input of an amplifier 3 disposed in the housing 4'; a pressure sensor 5 disposed in the housing 4'; and a pulse generator 6 having its trigger input coupled to the pressure sensor 5.

The device also comprises a coordinate counter 7 coupled to a computer communication line 8 and, via coordinate decoders 9, 10, to the coordinate buses 2.

There is a pulse distributor 11 having its input coupled to the output of the pulse generator 6, having its outputs 12, 13 coupled, respectively, to the inputs of the coordinate decoders 9, 10 and having its output 14 coupled to a counting input of the coordinate counter 7. The latter has its reset input coupled to the output of the pressure sensor 5.

The device further comprises a code-pulse decoder 15, whose input 16 is coupled to the output of the amplifier 3 and whose output is coupled to the computer communication line 8 and to a blocking input of the pulse generator 6, and a beginning-of-line symbol generator 17 disposed in the housing 4' and having its data output and its reset input 18 each coupled to the computer communication line 8.

The code-pulse decoder 15 comprises a two-digit binary counter 19, whose counting input is coupled to the output of the amplifier 3 and whose high-order digit place output is coupled to the blocking input of the pulse generator 6 and to the computer communication line 8, and an OR gate 20 whose output is coupled to a reset input of the two-digit binary counter 19 and whose inputs 21, 22 are coupled, respectively, to the input 14 of the pulse distributor 11 and to the output of the pressure sensor 5.

The beginning-of-line symbol generator 17 comprises a flip-flop 23 and a sensor 24 that acknowledges that a changeable writing member 38 touches the surface of the encoding tablet 1, said sensor 24 has its output coupled to one of the inputs of the flip-flop 23 which has its other input and its output each coupled to the computer communication line 8.

There is also an indication circuit incorporating a light indicator 25, an AND gate 26 whose output is coupled to the light indication means 25, and an AND gate 27 whose output is coupled to an input 28 of the AND gate 26 which has its input 29 coupled to the output of the code-pulse decoder 15; inputs 30, 31 of the AND gate 27 are coupled, respectively, to the output of the pressure sensor 5 and to the computer communication line 8.

A changeable encoding form 32 (FIG. 2) is divided into a zone 33 in which topological patterns or graphic input data, which may be topological pattern of structural formulae of chemical compounds, are encoded; and a zone 34 in which randomly selected alphabetic input data, which may be the names of atoms of structural fragments as well as different types of interatomic chemical bonds, are encoded. The changeable encoding form 32 bears a coordinate grid 35 whose points of intersection form nodal points 36, the coordinate grid 35 being aligned with the rectangular grid of the coordinate buses 2 (FIG. 1) of the encoding tablet 1.

In the zone 34 (FIG. 2) where alphabetic data is encoded, the coordinates of the nodal points 36 correspond to the codes of certain letters, digits, characters and special symbols displayed within the zone 34 between the lines of the coordinate grid 35. A special marker 37 is used to indicate that a given symbol belongs to a given nodal point 36 of the coordinate grid 35. For instance, the coordinates of the nodal point 36 of the coordinate grid 35 with the marker 37 belong to the letter C.

FIG. 3 illustrates the design features of an electronic writing means which is a unique and sufficient facility designed to exercise control over the operation of the entire device and to provide for encoding and inputting to a computer graphic data, and for representing the latter on the changeable encoding form 32 (FIG. 2), all these operations being performed concurrently.

The electronic writing means (FIG. 3) comprises the coordinate pickup 4, pressure sensor 5 (FIG. 1), beginning-of-line symbol generator 17, and changeable writing member 38 (FIG. 3). The beginning-of-line symbol generator 17 (FIG. 1) is used to register the displacement of the changeable writing member 38 (FIG. 3). with respect to its longitudinal axis.

The changeable writing member 38 is designed as part of the pressure sensor 5 (FIG. 1) and of the beginning-of-line symbol generator 17.

The sensor 24 (FIG. 1), that acknowledges that the changeable writing member 38 touches the surface of the writing tablet 1, and the pressure sensor 5 comprise altogether an elastic member 39 (FIG. 3), a movable collet member 40 with the changeable writing member 38, said collet member 40 being connected mechanically, via the elastic member 39, with the housing 4' of the coordinate pickup 4. The sensor 24 and the pressure sensor 5 are provided, respectively, with sensors 41, 42 that indicate axial position of the changeable writing member 38 and are connected mechanically with the housing 4'. The outputs of the sensors 41, 42 are coupled, respectively, to the input of the flip-flop 23 (FIG. 1) and to the blocking input of the pulse generator 6.

The housing 4' (FIG. 3) mounts the light indicator 25.

FIG. 4 illustrates the timing diagrams which help understand the operation of the device. These show the following: pulses a (FIG. 4) present on the output of the pressure sensor 5 (FIG. 1); pulses b (FIG. 4) on the input of the pulse distributor 11 (FIG. 1); pulses c (FIG. 4) on the output 12 (FIG. 1) of the pulse distributor 11; pulses d (FIG. 4) on the output 13 (FIG. 1) of the pulse distributor 11; pulses e (FIG. 4) on the output 14 (FIG. 1) of the pulse distributor 11; pulses f (FIG. 4) on the input 16 of the code-pulse decoder 15; signals g (FIG. 4) on the first digit place output of the two-digit binary counter 19 (FIG. 1); and signals h (FIG. 4) on the second digit place output of the two-digit binary counter 19 (FIG. 1). The timing diagrams use digits I, II, III, IV to designate the operating periods of the device.

The operation of the device for encoding and inputting to a computer alphabetic and topologically represented graphic data that describes, in particular, structural formulae of chemical compounds basically consists in the determination of the coordinates of the elements of graphic input data as well as in the production of service data in the form of a symbol which additionally describes the meaning of the elements and establishes interrelation therebetween. The encoding and inputting of alphabetic data may be considered in this case as a particular case relating to the encoding and inputting of topologically represented graphic data.

The device of the invention operates to determine the coordinates of the elements of graphic input data and the interrelation between the elements in the following manner. When the changeable writing member 38 (FIG. 3) touches the surface of the encoding tablet 1 (FIG. 1) so as to encode and feed in a computer the coordinates of an element of graphic data, the movable collet member 40 (FIG. 3) begins to move along the axis of the housing 4' and to compress concurrently the elastic member 39. At the moment that the movable collet member 40 approaches the sensitivity area of the sensor 41, the output of the latter, which serves as the output of the sensor 24 (FIG. 1), produces a control signal according to which the flip-flop 23 takes up the state 1.

At the moment that the changeable writing member 38 (FIG. 3) is forced to depress the surface of the encoding tablet 1 (FIG. 1) so as to activate the device, the movable collet member 40 (FIG. 3) further moves along the axis of the housing 4', thus pushing against the elastic member 39. When the movable collet member 40 approaches the sensitivity area of the sensor 42, which is the output element of the pressure sensor 5 (FIG. 1), the output of the sensor 42 produces a control signal. The latter passes to the reset input of the coordinate counter 7, which is therefore reset, and to the trigger input of the pulse generator 6 with the result that the device is activated.

Now consider the timing diagrams of FIG. 4, which illustrate the operation of the device.

With a control pulse a (FIG. 4) present on the trigger input of the pulse generator 6 (FIG. 1), the output of the latter produces a train of pulses b applied to the input of the pulse distributor 11 (FIG. 1). The time interval equal to three periods of input pulses b (FIG. 4) to the pulse distributor 11 (FIG. 1) amounts to a single operating period of the device. FIG. 4 shows four operating periods of the device, designated, respectively, as I, II, III, IV.

In each of the operating periods I, II, III, IV (FIG. 4) the pulse distributor 11 (FIG. 1) produces, in a given sequence and using a train of input pulses b, three pulses c, d, e (FIG. 4) at its outputs 12, 13, 14 (FIG. 1), these three pulses c,d,e being time-shifted with respect to one another by the value of the oscillation period of the pulse generator 6 (FIG. 1).

The signals from the outputs 12, 13 of the pulse distributor 11 arrive, respectively, at the strobing inputs of the coordinate decoders 9, 10. The outputs of the latter produce signals to excite a respective pair of the coordinate buses 2 in accordance with a digit code contained in the coordinate counter 7 and in synchronism with the passage of the signals from the outputs 12, 13 of the pulse distributor 11. This causes the excited coordinate buses 2 at right angles to each other to produce a pulsed flux of electromagnetic energy above the surface of the encoding tablet 1. The coordinate pickup 4 (FIG. 3), incorporated in the electronic writing means and disposed in proximity to the writing tip of the changeable writing member 38, converts the flux of electromagnetic energy from the coordinate buses 2 (FIG. 1) to electrical signals applied to the input of the amplifier 3. After amplification and shaping, these signals pass to the input 16 of the code-pulse decoder 15.

Within a given operating cycle of the device, the coordinate pickup 4 may be positioned above some of the coordinate buses 2 as follows: these are non-excited coordinate buses 2; only one coordinate bus 2, excited, is available; there is an area formed by two coordinate buses 2 which intersect each other. There may therefore result at the output of the amplifier 3 no pulses, a single pulse or two pulses in synchronism with the excitation signals applied to the coordinate buses 2. A control signal appears at the output of the code-pulse decoder 15 only when its input 16 receives two pulses during any one of the operating periods I, II, III, IV of the device.

Consider a situation in which the coordinate pickup 4 is not positioned above the intersection area of two coordinate buses 2, excited, during a given operating period. In this case, two first pulses c, d (FIG. 4) pass from the outputs 12, 13 of the pulse distributor 11 via the coordinate decoders 9, 10 to excite respective coordinate buses 2; however, no train of two pulses appears at the input of the code-pulse decoder 15 whose output does not produce, therefore, a control signal which could block the pulse generator 6. As a result, a train of pulses b (FIG. 4) continues to pass from the output of the pulse generator 6 to the input of the pulse distributor 11. The output 14 (FIG. 1) of the pulse distributor 11 thus produces the third pulse e (FIG. 4) which is the last one in the given operating cycle. That pulse a arrives at the counting input of the coordinate counter 7 (FIG. 1) so that the content of the latter is increment by 1. This makes the coordinate decoders 9, 10 ready for excitation during the next operating period of the next pair of the coordinate buses 2. On arrival of the current pulse from the output of the pulse generator 6 to the input of the pulse distributor 11, a new operating period commences. The operating periods are further repeated according to the sequence described above.

There may exist an operating period in which the coordinate pickup 4 is positioned above the intersection area of two excited coordinate buses 2. During the operating period, two pulses arrive at the input of the code-pulse decoder 15 whose output therefore produces a control signal. The latter passes to the blocking input of the pulse generator 6 and precludes the passage of a train of pulses from the output of the pulse generator 6 to the input of the pulse distributor 11. As a result, the output 14 of the pulse distributor 11 does not produce the third pulse within the given operating period and the content of the coordinate counter 7 is maintained constant. Now, the coordinate counter 7 remembers a digit code corresponding to the position of the coordinate pickup 4 relative to the surface of the encoding tablet 1. At the same time, the control signal from the output of the code-pulse decoder 15 is delivered to the computer communication line 8 to acknowledge that the device is ready to transmit data.

Delivered to the computer communication line 8 is data on the position coordinates of the coordinate pickup 4 and data from the output of the flip-flop 23, i.e., from the beginning-of-line symbol generator 17. After data exchange is completed, the computer communication line 8 sends an end-of-exchange signal which indicates that the line 8 is ready to receive new data; said signal arrives at the input 18 of the beginning-of-line symbol generator 17 and the flip-flop 23 therefore takes up its initial state.

On depression of the surface of the encoding tablet 1 (FIG. 1) by the changeable writing member 38 (FIG. 3), a control pulse a (logic 1, FIG. 4) is produced at the output of the pressure sensor 5, said control pulse a being applied to the input 22 (FIG. 1) of the OR gate 20. As a result, the output of the OR gate 20 produces a signal to drive the two-digit binary counter 19 to its initial state. In this case, the signals g and h (FIG. 4) at the first and second digit place outputs, respectively, of the counter 19 (FIG. 1) are logic 0's.

During operation, the counting input of the counter 19 produces various combinations of pulses f (FIG. 4) depending on the position of the coordinate pickup 4 with respect to the coordinate buses 2 in the given operating period. Possible cases are as follows: no one of pulses f (FIG. 4) appears (period I); a single pulse f (period II) appears in synchronism with a pulse c at the output 12 (FIG. 1) of the pulse distributor 11; a single pulse f (period III, FIG. 4) appears in synchronism with a pulse d (period III); two pulses f (period IV) in synchronism with pulses c, d (period IV) at the outputs 12, 13 (FIG. 1) of the pulse distributor 11.

During the period I (FIG. 4), the state of the couter 19 (FIG. 1) is held unaltered.

During the period II (FIG. 4), a pulse b applied to the counting input of the counter 19 (FIG. 1) causes the appearance of a signal g (logic 1, FIG. 4) at the first digit place output of the counter 19. A pulse e, available in this period from the output 14 (FIG. 1) of the pulse distributor 14, passes to the input 21 of the OR gate 20 and the counter 19 therefore takes up its initial state.

During the period III (FIG. 4), a pulse f appears at the counting input of the counter 19 (FIG. 1) at the time when a pulse d (FIG. 4) appears at the output 13 (FIG. 1) of the pulse distributor 11, while the first digit place output of the counter 19 produces a pulse g (logic 1, FIG. 4) in accordance with a pulse e from the output 14 (FIG. 1) of the pulse distributor 11. During this period, same as in the preceding one, the counter 19 is reset.

During the period IV (FIG. 4), the counting input of the counter 19 (FIG. 1) accepts a second pulse f (FIG. 4) at the time when a pulse d appears at the output 13 (FIG. 1) of the pulse distributor 11. A control signal h (logic 1, FIG. 4) appears at the second digit place output of the counter 19 (FIG. 1). That signal passes to the blocking input of the pulse generator 6 and precludes the production of a pulse e at the output 14 of the pulse distributor 11 and, therefore, the resetting of the counter 19. At the same time, the control signal from the counter 19 passes to the computer communication line 8 to indicate that the device is ready to transmit data.

If the device is started again, the events described above take place in the code-pulse decoder 15.

The indication circuit is used to check the device for serviceability and to check for the presence of data exchange between the device and a computer.

With the device inoperative, the light indicator 25 is maintained turned off, in its initial state. In this case, the output of the code-pulse decoder 15 produces logic 0 applied to the input 29 of the AND gate 26, while the output of the pressure sensor 5 and the computer communication line 8 produce logic 1's applied to the inputs 30, 31 of the AND gate 27 with the result that logic 0's are present on the input 28 and the output of the AND gate 26.

At the moment that the pressure sensor operates, logic 0 appears at the input 30 of the AND gate 27. Logic 1 to prepare the light indicator 25 for activation appears at the input 28 of the AND gate 26. Immediately after the production of a control signal at the output of the code-pulse decoder 25, logic 1 appears at the input 29 of the AND gate 26 and the light indicator 25 is therefore turned on. At the same time, the computer communication line 8 sends logic 0 to the input 31 of the AND gate 27 so as to preclude the turning-off of the light indicator 25 for the time interval within which data exchange is accomplished between the device and a computer. After that time interval has elapsed, logic 1 appears at the input 31 of the AND gate 27, which corresponds to the appearance of an end-of-exchange signal. Now, the AND gate 27 is held ready to turn off the light indicator 25. After the pressure has been removed from the changeable writing member 38 (FIG. 3), the output of the pressure sensor 5 (FIG. 1) produces logic 1 and the light indicator 25 is turned off.

Therefore, the light indicator 25 is turned on after the device has been activated and the coordinates of the position of the coordinate pickup 4 have been determined and is turned off after the exchange of data between the device and a computer has been completed and the pressure has been removed from the changeable writing member 38 (FIG. 3).

The changeable encoding form 32 (FIG. 2) has the coordinate grid 35 whose points of intersection constitute the nodal points 36 and is divided into the zone 33 in which the topological patterns of graphic input data are encoded and the zone 34 in which randomly selected alphabetic data is encoded. The size, position and content of the zones 33, 34 depend on the character of the problems being solved by the device in each specific case and on computer-oriented input data processing programs.

Figure 2:
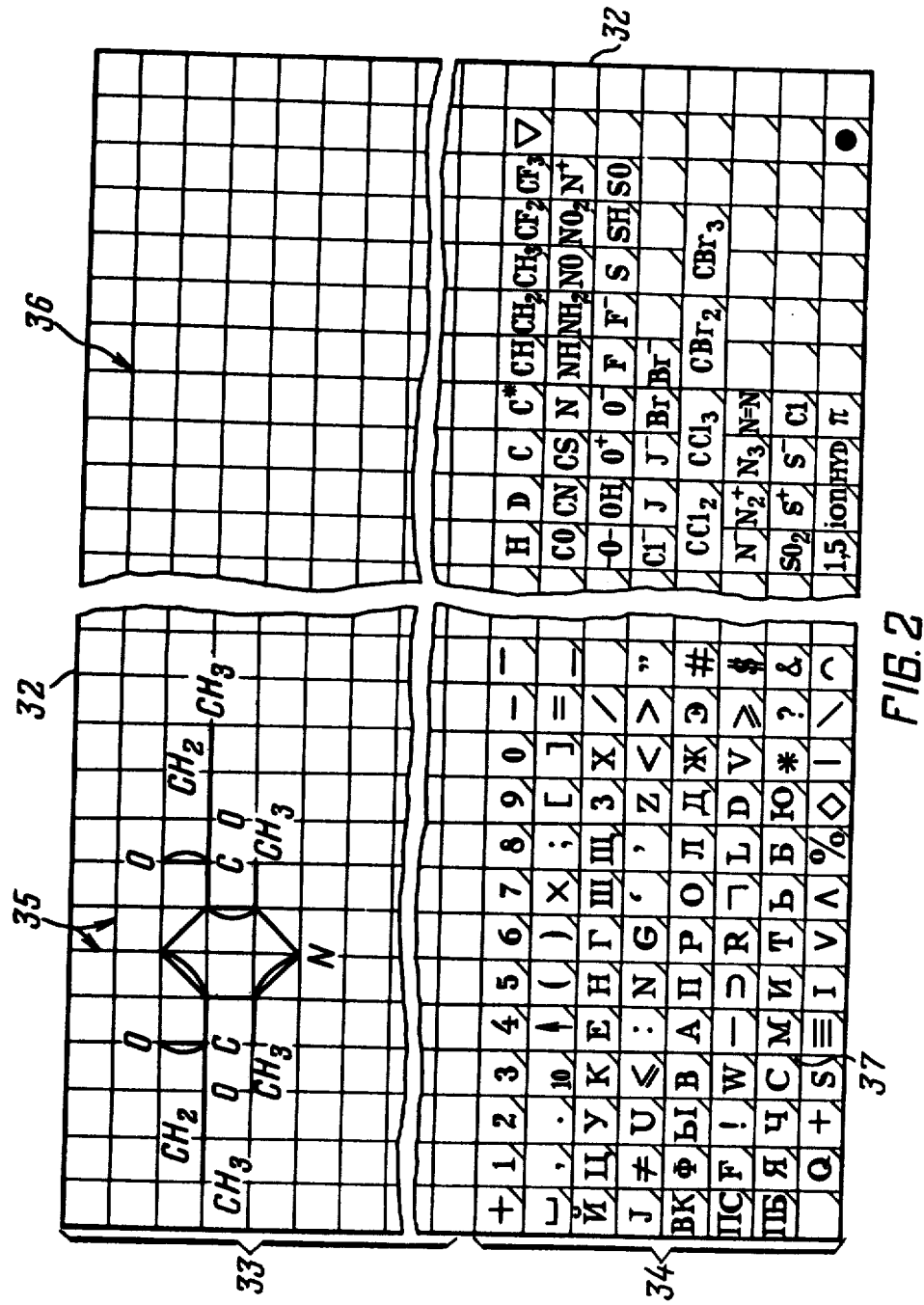
FIG. 2 shows a changeable encoding form with a coordinate grid, bearing alphabetic and graphic data in the form of a structural formula of a chemical compound, according to the invention.

FIG. 2 illustrates, by way of example, a set of symbols in the zone 34 for encoding alphabetic data, to be handled by the device which operates to encode and feed in a computer structural formulae of chemical compounds. The set comprises the letters, digits and characters of the most frequent use in computer engineering, the chemical designations of atoms and of the most frequently used structural fragments, the symbols for designation of various types of interatomic chemical bonds, and service characters.

When graphic data is encoded and input to a computer, the topological patterns of the data are represented on the changeable encoding form 32 with the help of the electronic writing means. The elements of graphic data to be input are represented so that the beginnings and the ends of respective lines are in coincidence with the nodal points 36 of the coordinate grid 35. When structural formulae of chemical compounds are represented, the tie points of the structural formulae are aligned with the nodal points 36 of the coordinate grid 35.

The spacing interval of the coordinate grid is determined by the character of problems being solved with the help of the device and is selected so that the following conditions are satisfied: there is provided a sufficient area to accomodate at the adjacent nodal points 36 the representations of the elements of graphic input data; the preset allowances of precision with which graphic input data is represented are guaranteed, these allowances apply to the precision of alignment of the representations of the elements of graphic input data with the nodal points 36; and the redundancy of output data is eliminated. To provide for the last-mentioned condition, the following procedure is utilized. The coordinates of the beginnings and the ends of the lines which represent the elements of graphic input data are encoded in a coordinate system which is determined by (1) the selected spacing interval of the coordinate grid 35 and (2) a condition in which the coordinates of input points represented with a preset deviation from the nodal points 36 are assigned to magnitudes of the coordinates corresponding to the nodal points 36.

The information of the coordinates of input points delivered from the device to a computer is supplemented by a service symbol which describes the interrelation between the elements of graphic input data. That service symbol is fed in a computer from the output of the beginning-of-line symbol generator 17 (FIG. 1) along with data on the coordinates of the point which serves as the origin of an interrelated sequence of input elements. The sequence is called an interrelated one if it is represented on the changeable encoding form 32 (FIG. 2), with the help of the electronic writing means, so that the changeable writing member 38 is held in permanent contact with the surface of the form 32. If the changeable writing member 38 (FIG. 3) takes off from the surface of the changeable encoding form 32 (FIG. 2) during the encoding and inputting of data and then touches the surface again and the coordinates of a new point are introduced, then, beginning from that point, a new interrelated sequence of elements is created and the coordinates of the preceding input point are used to define the end of the preceding sequence.

Consider now, by way of example taken to clarify the operation of the device, the operator's actions required in encoding and inputting to a computer a structural formula of a chemical compound.

The changeable encoding form 32 is placed on to the surface of the encoding tablet 1 (FIG. 1) and the coordinate grid 35 (FIG. 2) of the encoding form 32 is aligned with the coordinate buses 2 (FIG. 1) of the encoding tablet 1. Using the electronic writing means, which is a unique and sufficient facility exercising control over the device, the topological patterns of the structural formula are represented in a randomly selected part of the zone 33 (FIG. 2) of the encoding form 32. The tie points of the structural formula are aligned with the nodal points 36 of the coordinate grid 35, while the chemical bonds between the interrelated tie points of the structural formula are drawn with the changeable writing member 38 (FIG. 3) in permanent contact with the surface of the encoding form 32. If one must raise the writing member 38 in the course of representation of the topological patterns of the structural formula and then proceed with the drawing of new patterns, beginning with the tie point previously introduced, the computer receives these sequences as interrelated ones since the values of the coordinates of the points coincide with each other. This capability of the device considerably simplifies the representation of topological patterns and the adaptation of the human operator to the device is facilitated.

When the topological patterns of the structural formula are represented at the nodal points 36 (FIG. 2) coinciding with the tie points of the formula, the surface of the encoding form 32 is depressed by the changeable writing member 38 (FIG. 3) and the coordinates of respective points are thus encoded and fed in the computer.

The chemical bonds of single, double and triple types are encoded by drawing the patterns of a respective number of single bonds.

After the topological patterns have been represented, the tie points of the structural formula are assigned the names of atoms or structural fragments. For this, the changeable writing member 38 (FIG. 3) is lowered to depress the surface of the zone 34 (FIG. 2) at the nodal point 36 having its coordinates corresponding to the coded name of the given atom or structural fragment. After that, the changeable writing member 38 (FIG. 3) is operated to depress the surface of the zone 33 at the tie points of the structural formula which must be assigned the given names. The latter can be written down by the operator on the represented topological patterns with the help of the electronic writing means. The encoding and inputting of structural formulae of chemical compounds may be accompanied by the introduction to a computer the associated alphabetic data to be handled in the zone 34 (FIG. 2), which may be as follows: the names of compounds; empirical formulae; nos. of structural formulae according to catalogs, etc. With this done, the process of encoding and inputting to a computer a structural formula is terminated. The changeable encoding form 32 with structural formulae represented serves as a document of an archival collection and is used during encoding and inputting as a simple and reliable means for checking the operator's actions.

The device of the invention therefore ensures the completeness of encoding input data, alphabetic and topologically represented graphic, along with a minimal redundancy of output data, provision being made for the translation of input data, on a machine basis, into any codes desirable; provides a much higher productivity; makes it possible to simplify as much as possible the operations concerned with encoding and inputting data to a computer; provides the device which can be operated by semi-skilled operators; and ensures a simple and reliable monitoring of the operator's actions during encoding and inputting data to a computer. In addition, the proposed device features a higher reliability and makes it possible to considerably cut down the costs on the coding and inputting of alphabetic and topologically represented data to a computer.

What is claimed is:

1. A device for encoding and inputting to a computer via a computer communication line alphabetic and topologically represented graphic data that describes, in particular, structural formulae of chemical compounds, said device comprising:

an encoding tablet incorporating coordinate buses made in the form of linearly extended induction coils, arranged as a rectangular grid for establishing a flux of electromagnetic energy so as to generate the coordinates of input data;

a coordinate counter having outputs, a counting input and a reset input;

two coordinate decoders each having data inputs and an output;

said outputs of said coordinate counter, coupled to a computer communcation line and to said data inputs of said coordinate decoders;

said outputs of said coordinate decoders, coupled to said coordinate buses of said encoding tablet;

a coordinate pickup having a housing for converting said flux of electromagnetic energy from said coordinate buses of said encoding tablet into electrical signals;

an amplifier disposed within said housing of said coordinate pickup and having an input and an output;

said coordinate pickup coupled to said input of said amplifier;

a pressure sensor disposed in said housing of said coordinate pickup, said pressure sensor having an output;

a pulse generator having a trigger input, a blocking input and an output;

said trigger input of said pulse generator, coupled to said output of said pressure sensor;

a changeable encoding form divided into two zones as follows: a zone in which the topological patterns of graphic input data, of the type including topological patterns of structural formulae of chemical compounds, are encoded, and another zone in which randomly selected data, of the type including names of atoms, structural fragments and various types of interatomic chemical bonds, is encoded; said changeable encoding form having a coordinate grid formed with a preselected spacing interval selected such that there is a sufficient area to accommodate at the adjacent nodal points of said coordinate grid the representations of the elements of graphic input data, which may be the adjacent tie points of structural formulae;

a pulse distributor having an input and a plurality of outputs, said input of said pulse distributor being coupled to said output of said pulse generator to produce successive pulses at three of said plurality of outputs of said pulse distributor, said pulses being time-shifted with respect to one another by a time interval equal to the oscillation period of said pulse generator;

first and second outputs of said three outputs of said pulse distributor, coupled to said inputs of said coordinate decoders which operate to strobe in a given succession the signals from said two outputs of said outputs of said pulse distributor and to excite in a pulsed manner respectively coordinate buses of said coordinate buses of said encoding tablet;

the third output of said three outputs of said pulse distributor, coupled to said counting input of said coordinate counter;

said reset input of said coordinate counter, coupled to said output of said pressure sensor;

a code-pulse decoder for selecting a pair of pulses from a train of input signals, which follow each other with a delay equal to the oscillation period of said pulse generator, and to form a control signal;

an input and an output of said code-pulse decoder, said input being coupled to said output of said amplifier, and said output being coupled to a blocking input of said pulse generator and to said computer communication line;

a beginning-of-line symbol generator disposed within said housing of said coordinate pickup for generating interrelation symbols concerned with the elements of graphic input data, one of said symbols representing a relationship between the tie points of structural formulae of chemical compounds; a data output and a reset input of said beginning-of-line symbol generator, said data output and said reset input being coupled to said computer communication line;

a changeable writing member arranged as part of said pressure sensor and of said beginning-of-line symbol generator and disposed within said housing of said coordinate pickup;

said amplifier, said changeable writing member, said beginning-of-line symbol generator which registers the displacement of said changeable writing member along its longitudinal axis, and said pressure sensor form altogether an electronic writing means which exercises control over the operation of the entire device so that the encoding and inputting to a computer of graphic data is performed concurrently with the representation of this data on said changeable encoding tablet.

2. A device as claimed in claim 1, wherein said code-pulse decoder comprises:

a two-digit binary counter having a counting input and an output, said counting input being coupled to said output of said amplifier, and said output being coupled to said blocking input of said pulse generator and to said computer communication line;

an OR gate having inputs and an output, said output being coupled to said reset input of said two-digit binary counter, one of said inputs being coupled to said third output of said pulse distributor the second input being coupled to said output of said pressure sensor so as to enable the resetting of said code-pulse decoder at the end of each operating period of the device and at the moment that the device is started on activation of said pressure sensor.

3. A device as claimed in claim 1, wherein said beginning-of-line symbol generator comprises:

a flip-flop having inputs and an output;

a sensor that acknowledges that said changeable writing member touches the surface of said encoding tablet, said sensor being provided with an output coupled to one of said inputs of said flip-flop;

the second input and said output of said flip-flop, coupled to said computer communication line.

4. A device as claimed in claim 2, wherein said beginning-of-line symbol generator comprises:

a flip-flop having inputs and an output;

a sensor that acknowledges that said changeable writing member touches the surface of said encoding tablet, said sensor being provided with an output coupled to one of said inputs of said flip-flop;

the second input and said output of said flip-flop, coupled to said computer communication line.

5. A device as claimed in claim 1, comprising:

an indication circuit incorporating a light indicator for visual monitoring of the serviceability of the device, and of the presence of data exchange between the device and a computer;

a first AND gate having inputs and an output, said output being coupled to said light indicator;

a second AND gate having inputs and an output, said output being coupled to one of said inputs of said first AND gate;

the second input of said first AND gate, coupled to said output of said code-pulse decoder;

said inputs of said second AND gate, coupled to said output of said pressure sensor and to said computer communication line.

6. A device as claimed in claim 2, comprising:

an indication circuit incorporating a light indicator for visual monitoring of the serviceability of the device, and of the presence of data exchange between the device and a computer;

a first AND gate having inputs and an output, said output being coupled to said light indicator;

a second AND gate having inputs and an output, said output being coupled to said input of said first AND gate;

the second input if said first AND gate, coupled to said output of said code-pulse decoder;

said inputs of said second AND gate, coupled to said output of said pressure sensor and to said computer communication line.

7. A device as claimed in claim 3, comprising:

an indication circuit incorporating a light indicator for visual monitoring of the serviceability of the device, and of the presence of data exchange between the device and a computer;

a first AND gate having inputs and an output, said output being coupled to said light indicator;

a second AND gate having inputs and an output, said output being coupled to one of said inputs of said first AND gate;

the second input of said first AND gate, coupled to said output of said code-pulse decoder;

said inputs of said second AND gate, coupled to said output of said pressure sensor and to said computer computer communication line.

8. A device as claimed in claim 2, wherein said beginning-of-line symbol generator comprises:

a flip-flop having inputs and an output;

a sensor that acknowledges that said changeable writing member touches the surface of said encoding tablet, said sensor being provided with an output coupled to one of said inputs of said flip-flop;

a second input and said output of said flip-flop coupled to said computer communication line; wherein said sensor, that acknowledges that said changeable writing member touches the surface of the encoding tablet, and said pressure sensor comprise altogether an elastic member; further including a movable collet member mechanically connected with said housing of said coordinate pickup via said elastic member;

said sensor, that acknowledges that said changeable writing member touches the surface of said encoding tablet, further incorporating a first axial position sensor to indicate axial position of said changeable writing member, said first axial position sensor being mechanically connected with said housing of said coordinate pickup and being provided with an output, said output being coupled to said input of said flip-flop of said beginning-of-line symbol generator so as to produce a control signal at the moment that the changeable writing member touches the surface of said encoding tablet;

said pressure sensor further incorporating a second axial position sensor to indicate axial position of the changeable writing member, said second axial position sensor being mechanically connected with the housing of said coordinate pickup and being provided with an output, said output being coupled to said trigger input of said pulse generator so as to produce a control signal at the moment that the surface of said encoding tablet is depressed by said changeable writing member with the result that the device is activated.

9. A device as claimed in claim 3, wherein said sensor, that acknowledges that said changeable writing member touches the surface of said encoding tablet, and said pressure sensor comprise altogether an elastic member; further including a movable collet member mechanically connected with said housing of said coordinate pickup via said elastic member;

said sensor, that acknowledges that said changeable writing member touches the surface of said encoding table, further incorporating a first axial position sensor to indicate axial position of said changeable writing member, said first axial position sensor being mechanically connected with said housing of said coordinate pickup and being provided with an output, said output being coupled to said input of said flip-flop of said beginning-of-line symbol generator so as to produce a control signal at the moment that the changeable writing member touches the surface of said encoding tablet;

said pressure sensor further incorporating a second axial position sensor to indicate axial position of the changeable writing member, said second axial position sensor being mechanically connected with the housing of said coordinate pickup and being provided with an output, said output being coupled to said trigger input of said pulse generator so as to produce a control signal at the moment that the surface of the encoding table is depressed by said changeable writing member with the result that the device is activated.

10. A device as claimed in claim 5, wherein said beginning-of-line symbol generator comprises:

a flip-flop having inputs and an output;

a sensor that acknowledges that said changeable writing member touches the surface of said encoding table, said sensor being provided with an output coupled to one of said inputs of said flip-flop;

a second input and said putput of said flip-flop being coupled to said computer communication line; wherein said sensor, that acknowledges that said changeable writing member touches the surface of the encoding tablet, and said pressure sensor comprise altogether an elastic member; further including a movable collet member mechanically connected with said housing of said coordinate pickup via said elastic member;

said sensor, that acknowledges that said changeable writing member touches the surface of said encoding tablet, further incorporating a first axial position sensor to indicate axial position of said changeable writing member, said first axial position sensor being mechanically connected with said housing of said coordinate pickup and being provided with an output, said output being coupled to said input of said flip-flop of said beginning-of-line symbol generator so as to produce a control signal at the moment that the changeable writing member touches the surface of said encoding tablet;

said pressure sensor further incorporating a second axial position sensor to indicate axial position of the changeable writing member, said second axial position sensor being mechanically connected with the housing of said coordinate pickup and being provided with an output, said output being coupled to said trigger input of said pulse generator so as to produce a control signal at the moment that the surface of the encoding table is depressed by said changeable writing member with the result that the device is activated.

* * * * *